United States Patent [19]
Oziomek et al.

[11] Patent Number: 5,955,553
[45] Date of Patent: Sep. 21, 1999

[54] MOLECULAR WEIGHT REGULATION OF CIS-1,4-POLYBUTADIENE USING CARBOXYLATES

[75] Inventors: James Oziomek, Cuyahoga Falls; Thomas A. Antkowiak, Wadsworth, both of Ohio; Tristram W. Bethea, York, S.C.

[73] Assignee: Bridgestone Corporation, Akron, Ohio

[21] Appl. No.: 09/136,583

[22] Filed: Aug. 19, 1998

[51] Int. Cl.$^6$ .............................. C08F 2/38; C08F 136/06
[52] U.S. Cl. .................... 526/124.1; 526/84; 526/124.3; 526/125.3; 526/125.8; 526/137; 526/213; 526/216; 526/340.4
[58] Field of Search ............................... 526/84, 148, 152, 526/340.4, 124.1, 124.3, 125.3, 125.8, 213, 216, 137

[56] References Cited

U.S. PATENT DOCUMENTS

| | | |
|---|---|---|
| 3,337,515 | 8/1967 | La Heij et al. ........................... 526/84 |
| 3,483,177 | 12/1969 | Throckmorton et al. . |
| 3,497,489 | 2/1970 | Saltman et al. ........................... 526/84 |
| 3,528,957 | 9/1970 | Throckmorton et al. . |
| 3,753,967 | 8/1973 | Graff et al. ....................... 526/340.4 X |
| 3,856,764 | 12/1974 | Throckmorton et al. . |
| 3,910,869 | 10/1975 | Throckmorton . |
| 4,020,255 | 4/1977 | Schoneman et al. . |

*Primary Examiner*—Fred Teskin
*Attorney, Agent, or Firm*—David G. Burleson; Daniel N. Hall; Aaron B. Retzer

[57] ABSTRACT

There is disclosed a process for the regulation of the molecular weight of high cis polybutadiene prepared by polymerizing butadiene under solution polymerization conditions employing as the catalyst system a mixture of (a) organoaluminum compounds; (b) organonickel compounds; and (c) fluorine containing compounds; said polymerization being conducted in the presence of alkali or alkaline earth metal salts of organic carboxylic acids.

13 Claims, No Drawings

MOLECULAR WEIGHT REGULATION OF CIS-1,4-POLYBUTADIENE USING CARBOXYLATES

FIELD OF THE INVENTION

This invention relates to the use of carboxylates as molecular weight regulators in the polymerization of 1,4-polybutadiene.

BACKGROUND OF THE INVENTION

The polymerization of 1,3-butadiene to form high cis-1, 4-polybutadiene employing organonickel based catalyst systems has been described in several patents and publications.

In U.S. Pat. No. 3,856,764, issued Dec. 24, 1974, there is disclosed a process for producing cis-1,4-polybutadiene by contacting 1,3-butadiene with a catalyst consisting of (1) at least one organoaluminum compound, (2) at least one nickel compound selected from a class consisting of nickel salts of carboxylic acids, organic complex compounds of nickel and nickel tetracarbonyl and (3) at least one hydrogen fluoride complex prepared by complexing hydrogen fluoride with one or more members of a class consisting of ketones, esters, ethers, alcohols, nitrites and water.

In U.S. Pat. No. 3,528,957, issued Sep. 15, 1970, there is described the solution polymerization of butadiene to form high cis polybutadiene which comprises polymerizing butadiene in the presence of an organometal compound of groups 1, 2, and 3 of the Periodic Table with particular emphasis to trialkyl aluminum compounds and (2) at least one compound from the class consisting of organonickel compounds, and (3) at least one boron trifluoride complex prepared by complexing boron trifluoride with a member of the class consisting of monohydric alcohols, phenols, water and mineral acids containing oxygen.

In U.S. Pat. No. 3,910,869 issued Oct. 7, 1975, there is disclosed a process for the polymerization of butadiene to form polymers containing a high proportion of the butadiene units in the cis-1,4 configuration which comprises contacting the butadiene under solution polymerization conditions with a catalyst comprising (1) an organoaluminum compound, (2) an organonickel compound and (3) hydrogen fluoride.

In U.S. Pat. No. 3,483,177, issued Dec. 9, 1969, there is disclosed a process for the polymerization of butadiene to form polybutadiene containing a high proportion of the butadiene units in the cis-1,4 configuration which comprises contacting butadiene under polymerization conditions with a catalyst comprising (1) at least one organometallic compound in which the metal is selected from Groups I, II, and III of the Periodic System; (2) at least one organometallic compound selected from the class of nickel salts of carboxylic acids, organic complex compounds of nickel and nickel carbonyl; and (3) at least one boron trifluoride complex prepared by complexing boron trifluoride with a member of the class consisting of ketones, aldehydes, esters and nitrites.

In U.S. Pat. No. 4,020,255, issued Apr. 26, 1977, there is disclosed a process for preparing high cis-1,4-polybutadiene which comprises continuously polymerizing butadiene in an inert aliphatic or cycloaliphatic solvent using as a catalyst a mixture comprising (a) at least one trialkylaluminum wherein the alkyl group contains from 2 to 8 carbon atoms; (b) at least one nickel salt of a carboxylic acid; and (c) at least one boron trifluoride complex of ethers in which each of the individual catalyst components are continuously injected into the polymerization vessel containing the mixture of butadiene and inert solvent.

The second most important industrial catalyst system based on nickel to catalyze polybutadiene is the system employing a nickel carboxylate in conjunction with an organoaluminum compound and boron trifluoride etherate. This system also yields extremely high cis-1,4-polybutadiene. However, the molecular weights are slightly lower than the system employing the hydrogen fluoride or hydrogen fluoride complexes.

In many applications of cis-1,4-polybutadiene, it is usually desirable to employ higher molecular weight polymers than those generally obtained from either one of the immediately aforementioned polymerization systems. For example, in certain tire applications it is desirable to use a high cis-1,4-polybutadiene having a DSV (dilute solution viscosity) of about 3 or higher.

The invention described herein deals with the use of various alkali or alkaline earth metal salts of organic carboxylic acids, such as calcium carboxylate compounds, as molecular weight regulators for the above-mentioned polybutadiene syntheses. The utilization of these molecular weight regulators in organoaluminum/organonickel/fluorine catalyzed 1,3-butadiene polymerization systems permits the synthesis of high molecular weight cis-1,4-polybutadiene elastomers without significantly reducing the monomer conversion rate of the polymerization process.

These syntheses of various molecular weight polybutadienes can readily be effected in an anionic or an emulsion polymerization system by the mechanism of the catalyst level or the chain transfer level, respectively. However, these polymerization systems do not yield high cis-1,4-structure typical of the aluminumn/nickel/fluorine-based solution polymerizations mentioned above. For example, a typical alkyllithium initiated (anionic) 1,3-butadiene polymerization generally yields polymers containing 36–44 weight percent cis-1,4 polymer, 48–50 percent trans-1,4 polymer and 8–10 percent, 1,2 structures. On the other hand, a typical emulsion polymerization of butadiene yields a polymer containing about 60 percent trans-1,4 structure, about 20 percent cis-1,4 structure, and about 20 percent 1,2 structure.

The present invention expands the scope of high cis-1,4 directing 1,3-butadiene polymerization systems by producing high molecular weight cis-1,4-polybutadiene while maintaining desirable polymerization conversion rates.

SUMMARY OF THE INVENTION

The invention comprises a process for the regulation of the molecular weight of high cis polybutadiene prepared by polymerizing butadiene under solution polymerization conditions employing as the catalyst system a mixture of (a) organoaluminum compounds; (b) organonickel compounds; and (c) fluorine containing compounds; said polymerization being conducted in the presence of alkali or alkaline earth metal salts of organic carboxylic acids. These terms will be described in greater detail later in this application.

DETAILED DESCRIPTION OF THE INVENTION

It has been determined that alkali or alkaline earth metal salts of organic carboxylic acids are useful as molecular weight regulators in controlling the molecular weight of high cis-1,4-polybutadiene prepared by polymerizing butadiene under solution polymerization conditions. It was previously believed that these compounds were terminating agents in the polymerization of conjugated diene monomers. However it has been unexpectedly discovered that alkali or alkaline earth metal salts of organic carboxylic acids can be used to regulate the molecular weight and to produce high number average molecular weight ($M_n$) cis-1,4-polybutadiene.

The molecular weight regulating carboxylates useful in the practice of this invention may be represented by the formula: $(RCOO)_n M$ wherein R represents an alkyl, cycloalkyl, aryl, alkaryl and arylalkyl radicals containing from 1 to about 30 carbon atoms, M represents an alkali metal or an alkaline earth metal and n=1 or 2.

Suitable alkali metal carboxylate can be a carboxylate of an alkali metal such as lithium, sodium, potassium, cesium, and rubidium. Suitable alkaline earth metal carboxylate can be a carboxylate of an alkaline earth metal such as magnesium, calcium, barium, strontium and radium.

The alkali or alkaline earth metal salts of organic carboxylic acids, $(RCOO)_n M$, hereinafter referred to as metal carboxylates or metal salts of carboxylic acids, for use as molecular weight regulators in the present invention include salts of various single- and multivalent hydrocarbon groups having one or more carboxy group substituents such as unsubstituted, substituted, or polyfunctional aliphatic, alicyclic and aromatic mono- and polybasic carboxylates. The organic carboxylates may be either natural or synthetic, or mixtures thereof. Functional moieties include ether, ester, thioester, ketone, amine, nitrile, and heterocyclic linking groups and substituents. Examples of alkali or alkaline earth metal salts of natural acids, although usually refined, include alkali or alkaline earth metal salts of straight- and branched-chain carboxylic acids, including mixtures such as tall oil acids, and alkali or alkaline earth metal salts of cyclic carboxylic acids such as naphthenates. A variety of synthetic carboxylates, and particularly aliphatic carboxylates or mixtures thereof, are useful. The aliphatic carboxylates used in the present invention contain at least 2 carbon atoms and may contain up to about 30 carbon atoms or more. The alicyclic carboxylates can contain from 5 to about 30 carbon atoms. Aromatic carboxylates contain from 7 to about 30 carbon atoms. The alkaline earth metal carboxylates are generally preferred.

Generally, the aliphatic metal carboxylates will contain at least 4 carbon atoms, preferably contain at least about 6 and more preferably at least about 8 carbon atoms and in general up to about 18 carbon atoms, more preferably up to about 12 carbon atoms and even more preferably up to about 10 carbon atoms. When metal salts comprising more than one carboxylic acid are employed, the metal salts of carboxylic acids containing, for example, at least about six carbon atoms may be employed advantageously in combination with metal salts of carboxylic acids having as few as two carbon atoms as one of the acids of the metal salt mixture.

Examples of useful organic metal carboxylates include alkali and alkaline earth metal salts of acetic acid, propionic acid, butyric acid, isopentanoic acid, hexanoic acid, 2-ethyl butyric acid, benzoic acid, nonanoic acid, decanoic acid, 2-ethyl hexanoic acid, isooctanoic acid, isononanoic acid, neodecanoic acid, dodecanoic acid, lauric acid, palmitic acid, stearic acid, oleic acid, linoleic acid, commercially available mixtures of two or more carboxylic acids such as naphthenic acids, tall oil acids, rosin acids, and the like. Preferred metal salts of carboxylic acids are calcium carboxylates, most preferably calcium isooctanoate.

The amount of alkali or alkaline earth metal salts of organic carboxylic acids used to control the molecular weight of the resultant cis-1,4-polybutadiene may be within the range of about 0.02 to 2.0 percent of the total amount of monomer to be polymerized. Expressed as a mole ratio of alkali or alkaline earth metal salts of organic carboxylic acids to nickel complex the amount of metal carboxylate present during the polymerization step can be within the range of about 1 to about 3000 times the concentration of nickel. The preferred mole ratio of metal carboxylate to nickel is about 1:1 to 500:1. It is most preferred to use about 2:1 to about 25:1. The metal carboxylates are preferably added to the polymerization system after the addition of the catalyst in order to insure complete initiation and catalyst utilization.

Utilizing the molecular weight regulating metal carboxylates useful in the practice of this invention it is possible to produce cis-1,4-polybutadiene having a number average molecular weight ($M_n$) ranging from than 50,000 to greater than 200,000 while maintaining high conversion rates of 1,3-butadiene monomer to cis-1,4-polybutadiene.

In the preparation of cis-1,4-polybutadiene it is desirable to employ as the catalyst system a mixture of (a) organoaluminum compounds; (b) organonickel compounds; and (c) fluorine containing compounds.

By the term "organoaluminum compound" is meant any organoaluminum compound responding to the formula:

$$Al\ R_1(R_2)(R_3)$$

in which $R_1$ is selected from the group consisting of alkyl (including cycloalkyl), aryl alkaryl, arylalkyl, alkoxy, and hydrogen; $R_2$ and $R_3$ being selected from the group of alkyl (including cycloalkyl), aryl, alkaryl, and arylalkyl. Representative of the compounds corresponding to the formula set forth above are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenylethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride and other organoaluminum hydrides. Also included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. Also included are diethylaluminum ethoxide, diisobutylaluminum ethoxide and dipropylaluminum methoxide.

The component of the catalyst of this invention which contains nickel may be any organonickel compound. It is preferred to employ a soluble compound of nickel. Thus, nickel salts of carboxylic acids and organic complex compounds of nickel are suitable. These soluble nickel compounds are normally compounds of nickel with a mono or bi dentate organic ligand containing up to 20 carbons. "Ligand" is defined as an ion or molecule bound to and considered bonded to a metal atom or ion. Mono dentate means having one position through which covalent or coordinate bonds with the metal may be formed; bi dentate means having two positions through which covalent or coordinate bonds with the metal may be formed. By the term "soluble" is meant soluble in inert solvents. Thus, any salt or an organic acid containing from about 1 to 20 carbon atoms may be employed. Representative of organonickel compounds are nickel benzoate, nickel acetate, nickel naphthenate, nickel octanoate, bis(alpha-furyl dioxime) nickel, nickel palmitate, nickel stearate, nickel acetylacetonate, nickel salicaldehyde, bis(salicylaldehyde) ethylene diimine nickel, bis(cyclopentadienyl) nickel, cyclopentadienylnickel nitrosyl and nickel tetracarbonyl. The preferred component containing nickel is a nickel salt of a carboxylic acid or an organic complex compound of nickel, such as a nickel boroacylate in which the acyl group is derived from the organic acids cited above.

Another component of the catalyst system employed in this invention is a fluorine containing compound. The fluorine may be supplied by hydrogen fluoride, boron trifluoride, or by hydrogen fluoride and boron trifluoride being complexed with a member of the class consisting of monohydric alcohols, phenols, water, mineral acids containing oxygen, water, aldehydes, esters, ethers, ketones and nitriles.

The ketone subclass can be defined by the formula R'COR where R' and R represent a alkyl, cycloalkyl, aryl, alkaryl and arylalkyl radicals containing from 1 to about 30 carbon atoms; R' and R may be the same or dissimilar. These ketones represent a class of compounds which have a carbon atom attached by a double bond to oxygen. Representative but not exhaustive of the ketones useful in the preparation of the boron trifluoride and hydrogen fluoride complexes of this invention are acetone, methyl ethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. Typical complexes of the ketones are boron trifluoride.acetophenone and boron trifluoride.benzophenone, also hydrogen fluoride.acetophenone and hydrogen fluoride.benzophenone and hydrogen fluoride.acetone.

The aldehyde subclass can be defined by the formula R—CHO where R represents an alkyl, cycloalkyl, aryl, alkaryl and arylalkyl radical containing from 1 to about 30 carbon atoms. The aldehydes have a carbon atom attached to an oxygen atom by means of a double bond. Representative but not exhaustive of the aldehydes are butyraldehyde, anisaldehyde, cinnamic aldehyde, isobutyraldehyde, heptaldehyde, dodecylaldehyde, benzaldehyde, phenylacetaldehyde, tolualdehyde, m-nitrobenzaldehyde, p-nitrobenzaldehyde, m-hydrobenzaldehyde and the like. Typical complexes formed from the aldehydes are boron trifluoride.benzaldehyde, boron trifluoride.tolualdehyde, hydrogen fluoride.benzaldehyde and hydrogen fluoride.tolualdehyde.

The ester subclass can be represented by the formula R'—COOR where R' and R are represented by alkyl, cycloalkyl, aryl, alkaryl, and arylalkyl radicals containing from 1 to about 30 carbon atoms. The esters contain a carbon atom attached by a double bond to an oxygen atom. Representative but not exhaustive of the esters are ethyl butyrate, ethyl octanoate, isopropyl hexanoate, amyl acetate, hexyl propionate, cetyl acetate, ethyl benzoate, amyl benzoate, phenyl acetate, phenyl butyrate, phenyl benzoate and the like. Typical complexes formed from the esters are boron trifluoride.ethyl benzoate and boron trifluoride.phenyl acetate; also hydrogen fluoride.ethyl benzoate, and hydrogen fluoride.phenyl acetate.

The ether subclass can be defined by the formula R—O—R where each R independently represents an alkyl, cycloalkyl, aryl, alkaryl and arylalkyl radical containing from 1 to about 30 carbon atoms. Representative but not exhaustive of the ethers are ethoxybutane, ethoxyoctane, isopropoxyhexane, propoxyhexane, ethoxybenzene, amyloxybenzene and the like.

The nitrile subclass can be represented by the formula RCN wherein R represents an alkyl, cycloalkyl aryl, alkaryl, and arylalkyl. The nitrites contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. Typical complexes prepared from the nitrites are boron trifluoride.benzonitrile, and hydrogen fluoride.benzonitrile.

The monohydric alcohol subgroup of the above class of compounds can be symbolically portrayed as ROH where R represents an alkyl, cycloalkyl, and an arylalkyl radical containing from 1 to 30 carbon atoms. Representative, but not exhaustive of the alcohol group, are methanol, ethanol, n-propanol, isopropanol, n-butanol, benzyl alcohol, and the like. Typical complexes formed from the above groups are as follows: $BF_3$.methanol, $BF_3$.ethanol, $BF_3$.butanol, $BF_3$.n-hexanol HF.methanol, HF.butanol and HF.hexanol The phenol subgroup of the above class of compounds can be symbolically portrayed as $\Phi$-OH wherein $\Phi$ represents a benzenoid group. Representative but not exhaustive of the phenol group are phenol, p-cresol, resorcinol, naphthol, hydroquinone and the like. Typical complexes formed from the above phenol subgroup are as follows: $BF_3$.2-phenol, $BF_3$.p-cresol, HF.p-cresol and HF.phenol.

A number of the members in the subgroup mineral acids containing oxygen will complex with $BF_3$ and HF. Representative but not exhaustive of the mineral acid subgroup are phosphoric acid, sulfuric acid, nitric acid and the like. The preferred complexes formed from the mineral acid subgroup are $BF_3$-100% phosphoric acid and $BF_3$-85% phosphoric acid, and HF-100% phosphoric acid.

Water, although in a subgroup by itself, forms at least two hydrate complexes. These are $BF_3.H_2O$ and $BF_3.2H_2O$.

When not available commercially, many of the boron trifluoride complexes can be readily formed by directly contacting boron trifluoride gas, (a colorless gas at ordinary temperatures and pressures) with the compound used as the complexing agent, that is, the electron donor compound. This contact is accomplished with a reacting apparatus combined with a sensitive weighing mechanism in order to achieve the desired mole ratios between the $BF_3$ and the electron donor compound. The reaction is carried out under an inert atmosphere. The reaction environment may consist only of the reacting components, $BF_3$ gas and the electron donor compound, or when convenient, the reaction may be carried out in the medium of an inert organic diluent. This last condition is usually necessary when the electron donor compound exists as a solid and must be put into solution or suspension to insure adequate contact with the $BF_3$ gas.

The various boron trifluoride complexes vary greatly in their shelf life stability. Some, for example, $BF_3$.isopropanol are quite unstable in daylight at room temperature. Others, for example, $BF_3$.phenol are quite stable and possess a relatively long shelf life at room temperature. Where the particular $BF_3$ complex, specified as a catalyst component, possesses an unstable shelf life, it should be prepared as near to the time of polymerization as feasible.

Hydrogen fluoride is a limpid liquid which fumes strongly in air, is very poisonous, forms ulcerated sores if it comes in contact with the skin, and is very dangerous to handle or to manipulate. By complexing the hydrogen fluoride with the complexing agents heretofore mentioned, some of the advantages of this invention are a safer, easier and more accurate way of handling the hydrogen fluoride component of the catalyst system. Hydrogen fluoride complexes usually have a lower vapor pressure and do not fume as badly as does hydrogen fluoride. Hydrogen fluoride boils at 19.7° C., whereas a 40% by weight of hydrogen fluoride diethyl ether azeotrope boils at 74° C. When the hydrogen fluoride is complexed, the corrosiveness of the hydrogen fluoride is reduced. The hydrogen fluoride complex can be dissolved in a solvent and thus can be handled and charged to the system as a liquid solution. The solvent which can be employed may be an alkyl, alkaryl, arylalkyl or an aryl hydrocarbon. Benzene, for example, is a convenient solvent system.

The complexes of this invention are usually prepared by simply dissolving appropriate amounts of the complexing agent, for instance, a ketone, an ether, an ester, an alcohol, a nitrile or water, in a suitable solvent and an appropriate amount of the hydrogen fluoride in a suitable solvent and mixing the two solvent systems. The mixing of the complexing agents, except water, should be done in the absence of water vapor. Another possible method would be to dissolve either the hydrogen fluoride or the complexing agent in a suitable solvent and adding the other component. Still another method of mixing would be to dissolve the complexing agent in a solvent and simply bubble gaseous hydrogen fluoride through the system until the complexing agent is reacted with hydrogen fluoride. The concentrations may be determined by weight gain or chemical titration. The amount of complexing agent cannot be specifically set down. The amount of complexing agent may be a range depending on the conditions of the reaction system, the hydrogen bonding strength of the complexing agent, the size of the complexing agent, or it may be an equilibrium between the hydrogen fluoride complex and the hydrogen fluoride plus the complexing agent.

When the fluorine containing compounds is derived from boron trifluoride or a boron trifluoride complex, the optimum concentration from any one catalyst component changes from that when HF is employed, since boron trifluoride contains three atoms of fluorine, and thus the molar ratio of the catalyst components will be different. For instance, when the organoaluminum compound (Al) to the organonickel compound (Ni) ranges from about 0.3/1 to about 500/1, and when the mole ratio of the boron trifluoride complex prepared by complexing boron trifluoride with a member of the class consisting of esters, aldehydes, ketones and nitriles ($BF_3$.complex) to the organonickel compound (Ni) ranges from about 0.3/1 to about 500/1, the mole ratio of the organoaluminum (Al) to the $BF_3$.complex ranges from about 0.1/1 to about 4/1.

The preferred Al/Ni mole ratio ranges from about 1/1 to about 150/1; the preferred $BF_3$. or $BF_3$.complex/Ni mole ratio ranges from about 1/1 to about 150/1; and the preferred Al/$BF_3$.complex mole ratio ranges from about 0.3/1 to about 1.4/1.

When the fluorine containing compound is derived from hydrogen fluoride or a hydrogen fluoride complex, the polymerization activity is successful over a wide range of catalyst concentrations and catalyst ratios. The three catalyst components interact to form the catalyst components. As a result, the optimum concentration or any one catalyst component is very dependent upon the concentration of each of the other two catalyst components. Furthermore, while polymerization will occur over a wide range of catalyst concentrations and mole ratios, polymer having the most desirable properties are obtained over a more narrow range.

Polymerization can occur while the mole ratio of the organoaluminum compound (Al) to the organonickel compound (Ni) ranges from about 0.3/1 to about 300/1; the mole ratio of HF or hydrogen fluoride complex (HFC) to the organonickel compound (Ni) ranges from about 2/1 to about 300/1 and the mole ratio of hydrogen fluoride complex to the organoaluminum compound ranges from about 0.2/1 to about 15/1. However, the preferred mole ratios of Al/Ni ranges from about 2/1 to about 80/1, the preferred mole ratio of HF or HFC/Ni ranges from about 5/1 to about 100/1 and the preferred mole ratio of HF or HFC/Al ranges from about 0.4/1 to about 7/1. The concentration of the catalyst employed depends on factors such as purity, rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

The three catalyst components usefully in this invention can be charged separately to the reactor containing the butadiene and the solvent system therefore either stepwise or simultaneously. It has been discovered that when the three catalyst components are mixed together outside of the reactor and then added to the reactor, the catalyst system is not as active. Thus, the catalyst should not be preformed by mixing the three catalyst components together prior to contacting butadiene.

In general, the polymerizations of this invention are carried out in an inert solvent, and are, thus, solution polymerizations. By the term "inert solvent" is meant that the solvent or diluent does not enter into the structure of the resulting polymer nor does it have any adverse effect on the activity of the catalyst employed. Such solvents are usually aliphatic, aromatic, or cycloaliphatic hydrocarbons, examples of which are pentane, hexane, toluene, benzene, cyclohexane and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, e.g. butane or pentane, in which the polymer formed is insoluble. It should be understood, however, that it is not intended to exclude bulk polymerizations from the scope of this application.

It is usually desirable to conduct the polymerizations of this invention employing air-free and moisture-free techniques.

The temperatures employed in the polymerizations of this invention are not critical and may vary from a very low temperature such as –10° C. or below up to high temperatures such as 140° C. or higher. However, it is usually more desirable to employ a more convenient temperature between about 40° C. and about 120° C.

The practice of this invention is further illustrated by reference to the following examples which are intended to be representative rather than restrictive of the scope of this invention. Unless otherwise noted, all parts are given in milliliters of the stock catalyst solutions of the specified concentration. Dilute solution viscosities (DSV) have been determined in toluene at 30° C.

EXAMPLES 1 to 6

A 1,3-butadiene/n-hexane (c.a. 25 weight percent of 1,3-butadiene) solution was dried to polymerization grade by passing it through a molecular sieve column under nitrogen atmosphere. Aliquots (~300 ml) of the column passed solution were dispensed into 32 oz. septum capped bottles fitted with drilled crown caps.

A series of polymerizations were run to evaluate calcium iso-octanate as a molecular weight regulator. Catalyst components were then added to the butadiene solution in the following order: triisobutyl aluminum, nickel boroacylate, and finally $BF_3/n-C_6H_{13}OH$; and polymerization was conducted in a 40° C. water bath. In each polymerization the calcium isooctanoate modifier was added by hypodermic syringe to a polymerization bottle already containing catalyzed monomer solution at the time indicated in Table I. The polymerization bottle was then repositioned into the 40° C. water bath and the bottle was agitated. After 19 hours the bottle was removed from the bath and the reaction terminated by adding isopropanol (about 1 phm) and 2,6-ditertiary butyl-p-cresol (1 phm) and enough hexane to dilute the polymer cements to viscosities to allow easy removal of the cement from the bottle. The solvent was then allowed to evaporate at room temperature followed by vacuum drying at 60° C. Polymer dilute solution viscosity (DSV) was determined on 0.2 weight/volume percent toluene solution at 30° C. Process conditions, reactant and catalyst ratios (molar ratios) and polymer properties of the recovered cis polybutadiene are displayed in Table I.

EXAMPLE 7

A polymerization was carried out using the procedures essentially identical to those in Examples 1 to 6, except 0.5 ml of isopropanol was added in place of calcium isooctanoate. Process conditions, reactant and catalyst ratios (molar ratios) and polymer properties of the recovered cis polybutadiene are displayed in Table I.

EXAMPLES 8 to 20

A series of polymerizations were carried out using the procedures of Examples 1 to 6, except a 12.5% by weight of a 1,3-butadiene in n-hexane (c.a. 12.5 weight percent of 1,3-butadiene) solution was used. Process conditions, reactant and catalyst ratios (molar ratios) and polymer properties of the recovered cis polybutadiene are displayed in Table II.

TABLE I

Polymerization With 25% Butadiene/Hexane Blend

| Example No. | 1 | 2 | 3 | 4 | 5 | 6 | 7 |
|---|---|---|---|---|---|---|---|
| B/Al | 1.32 | 1.32 | 1.32 | 1.32 | 1.32 | 1.32 | 1.32 |
| Al/Ni | 16.9 | 16.9 | 16.9 | 16.9 | 16.9 | 16.9 | 16.9 |
| ml of 25% Bd/hexane | 317 | 317 | 317 | 317 | 317 | 317 | 317 |
| wt Bd (gm) | 52 | 52 | 52 | 52 | 52 | 52 | 52 |
| Ml of 0.02 M Ni | 1.53 | 1.53 | 1.53 | 1.53 | 1.53 | 1.53 | 1.53 |
| ml of 0.68 M i-Bu$_3$Al | 0.76 | 0.76 | 0.76 | 0.76 | 0.76 | 0.76 | 0.76 |
| ml of BF$_3$[a] | 0.15 | 0.15 | 0.15 | 0.15 | 0.15 | 0.15 | 0.15 |
| Ml of 2.50 M Ca$^{++}$ | 0.00 | 0.03 | 0.03 | 0.09 | 0.15 | 0.27 | 0.5 ml isopropanol |
| Mmole of Ca$^{++}$ | 0.00 | 0.08 | 0.08 | 0.23 | 0.38 | 0.68 | 0.00 |
| time(min)[b] | — | 7 | 5 | 5 | 5 | 5 | 5 |
| % yield | 94.0 | 100 | 99.2 | 98.7 | 99.0 | 94.0 | 19.0 |
| DSV | 3.20 | 3.36 | 3.29 | 4.23 | 5.30 | 6.14 | 3.28 |
| % gel | 1.1 | 1.5 | 1.4 | 1.0 | 0.9 | 1.1 | 1.5 |
| M$_n$ | 101687 | 100476 | 100033 | 110493 | 192287 | 197641 | 78026 |
| M$_w$ | 446249 | 480517 | 441998 | 712037 | 909598 | 1149486 | 526497 |
| M$_w$/M$_n$ | 4.39 | 4.78 | 4.42 | 6.44 | 4.73 | 5.82 | 6.75 |
| T$_g$(—C) | 104.8 | 103.6 | 105.3 | 104.7 | 105.1 | 103.9 | 104.5 |
| T$_m$(—C) | 6.6 | 5.4 | 6.2 | 5.8 | 6.3 | 6.4 | 6.3 |

[a]$BF_3/n-C_6H_{13}OH$ (4.68Ml ca BF$_3$)
[b]time in minutes to addition of molecular weight regulator after addition of catalyst at 40° C.

TABLE II

Polymerization With 12.5% Butadiene/Hexane Blend

| Example No. | 8 | 9 | 10 | 11 | 12 | 13 | 14 | 15 | 16 | 17 | 18 | 19 | 20 |
|---|---|---|---|---|---|---|---|---|---|---|---|---|---|
| B/Al | 1.32 | 1.32 | 1.32 | 1.32 | 1.32 | 1.32 | 1.32 | 1.32 | 1.32 | 1.32 | 1.32 | 1.32 | 1.32 |
| Al/Ni | 16.9 | 16.9 | 16.9 | 16.9 | 16.9 | 16.9 | 16.9 | 16.9 | 16.9 | 16.9 | 16.9 | 16.9 | 16.9 |
| ml 25% Bd/hexane | 300 | 300 | 300 | 300 | 300 | 300 | 300 | 300 | 300 | 300 | 300 | 300 | 300 |
| wt Bd (gm) | 50 | 50 | 50 | 50 | 50 | 50 | 50 | 50 | 50 | 50 | 50 | 50 | 50 |
| ml hexane | 300 | 300 | 300 | 300 | 300 | 300 | 300 | 300 | 300 | 300 | 0[b] | 300 | 300 |
| ml 0.02 M Ni | 1.53 | 1.53 | 1.53 | 1.53 | 1.53 | 1.53 | 1.53 | 1.53 | 1.53 | 1.53 | 1.53 | 1.53 | 1.53 |
| ml 0.68 M i-Bu$_3$Al | 0.76 | 0.76 | 0.76 | 0.76 | 0.76 | 0.76 | 0.76 | 0.76 | 0.76 | 0.76 | 0.76 | 0.76 | 0.76 |
| ml BF$_3$[a] | 0.15 | 0.15 | 0.15 | 0.15 | 0.15 | 0.15 | 0.15 | 0.15 | 0.15 | 0.15 | 0.15 | 0.15 | 0.15 |
| ml 2.50M Ca$^{++}$ | 0.00 | 0.08 | 0.15 | 0.23 | 0.30 | 0.38 | 0.45 | 0.5 ml | 0.60 | 0.76 | 0.91 | 0.91 | 1.21 |
| mmole Ca$^{++}$ | 0.00 | 0.19 | 0.38 | 0.57 | 0.76 | 0.95 | 1.13 | 0.00 | 1.51 | 1.89 | 2.27 | 2.27 | 3.02 |

TABLE II-continued

Polymerization With 12.5% Butadiene/Hexane Blend

| Example No. | 8 | 9 | 10 | 11 | 12 | 13 | 14 | 15 | 16 | 17 | 18 | 19 | 20 |
|---|---|---|---|---|---|---|---|---|---|---|---|---|---|
| time (min)[b] | — | 5 | 5 | 5 | 5 | 5 | 5 | 5 | 5 | 5 | 5 | 5 | 5 |
| % yield | 98.4 | 95.2 | 95 | 81.2 | 66.6 | 62.6 | 42.6 | 118 | 30.4 | 15.6 | 34.8 | 17 | 10 |
| DSV | 3.34 | 4.21 | 4.95 | 6.34 | 6.36 | 6.53 | 6.31 | 2.55 | — | — | — | — | — |
| % gel | 1.1 | 0.9 | 1.1 | 0.4 | 0.5 | 0.4 | 0.6 | 2.3 | — | — | — | — | — |
| $M_n$/1000 | 112.2 | 105.2 | 136.7 | 201.6 | 148.0 | 174.6 | 217.8 | 565.3 | — | — | — | — | — |
| $M_w$/1000 | 536.3 | 735.6 | 933.5 | 1261 | 1162 | 1183 | 1191 | 332.5 | — | — | — | — | — |
| $M_w/M_n$ | 4.78 | 6.99 | 6.83 | 6.25 | 7.85 | 6.77 | 5.47 | 5.88 | — | — | — | — | — |
| $T_g$(—°C.) | 105.2 | 106.3 | 104.8 | 105.8 | 105.1 | 105.1 | 104.3 | 104.4 | — | — | — | — | — |
| $T_m$(—°C.) | 7.5 | 7.3 | 6.7 | 6.6 | 6.0 | 5.0 | 5.1 | 5.5 | — | — | — | — | — |

[a]$BF_3$/n-$C_6H_{13}$OH (4.68Ml ca $BF_3$)
[b]25% solids
[c]time in minutes to addition of molecular weight regulator after addition of catalyst at 40° C.

While certain representative embodiments and details have been shown for the purpose of illustrating the invention, it will be apparent to those skilled in this art that various changes and modifications may be made therein without departing from the scope of the invention.

We claim:

1. A process for the regulation of the molecular weight of high cis polybutadiene prepared by polymerizing butadiene under solution polymerization conditions, employing as the catalyst, a mixture of: (a) an organoaluminum compound; (b) an organonickel compound; and (c) a fluorine containing compound; said polymerization being conducted in the presence of a molecular weight regulator comprising at least one alkali or alkaline earth metal salt of an organic carboxylic acid containing at least 2 carbon atoms, said molecular weight regulator being employed in amounts ranging from 0.01 to 1.0 parts per 100 parts of butadiene.

2. The process of claim 1 wherein the alkali or alkaline earth metal salt of a carboxylic acid is at least one of an alkali or alkaline earth metal salt of propionic acid, butyric acid, isopentanoic acid, hexanoic acid, 2-ethylbutyric acid, nonanoic acid, decanoic acid, 2-ethylhexanoic acid, isooctanoic acid, isononanoic acid, neodecanoic acid, dodecanoic acid, lauric acid, palmitic acid, stearic acid, oleic acid, linoleic acid, naphthenic acids, tall oil acids, and rosin acids.

3. The process of claim 1 wherein the alkali or alkaline earth metal salt of a carboxylic acid is represented by the formula $(RCOO)_n$ wherein R represents an alkyl, cycloalkyl, aryl, alkaryl and arylalkyl radicals containing from 1 to about 30 carbon atoms and M represents an alkali metal or an alkaline earth metal and n is 1 or 2.

4. The process of claim 1 wherein the alkali or alkaline earth metal salt of a carboxylic acid is calcium isooctanoate.

5. The process according to claim 1 in which the fluorine compound of (c) is boron trifluoride or a boron trifluoride complex prepared by complexing boron trifluoride with a member selected from the group consisting of monohydric alcohols, phenols, water, mineral acids containing oxygen, aldehydes, esters, ethers, ketones and nitriles.

6. The process according to claim 1 in which the fluorine compound of (c) is hydrogen fluoride or a hydrogen fluoride complex prepared by complexing hydrogen fluoride with a member selected from the group consisting of monohydric alcohols, phenols, water, mineral acids containing oxygen, aldehydes, esters, ethers, ketones and nitriles.

7. The process according to claim 5 in which the molar ratio of the organoaluminum compound to the organonickel compound ranges from about 0.3/1 to about 300/1, the mole ratio of the fluorine-containing compound to the organonickel compound ranges from about 0.3/1 to 300/1 and wherein the mole ratio of the organoaluminum compound to the fluorine-containing compound ranges from about 0.1/1 to about 4/1.

8. The process according to claim 1 in which the organonickel compound is selected from the group consisting of nickelbenzoate, nickelnaphthenate, nickeloctanoate, nickelstearate or bis(cyclopentadienylnickel), nickeltetracarbonyl and a nickelboroacylate.

9. The process according to claim 1 in which the organoaluminum compound is selected from the group consisting of triisobutylaluminum and triethylaluminum.

10. A process for the regulation of the molecular weight of high cis polybutadiene prepared by polymerizing butadiene under solution polymerization conditions; said polymerization being conducted in the presence of a molecular weight regulator represented by the formula $(RCOO)_nM$ wherein R represents an alkyl, cycloalkyl, aryl, alkaryl and arylalkyl radicals containing from 1 to about 30 carbon atoms and M represents an alkali metal or an alkaline earth metal and n is 1 or 2.

11. The process according to claim 10, said molecular weight regulator being employed in amounts ranging from 0.01 to 1.0 parts per 100 parts of butadiene.

12. The process of claim 10 wherein the alkali or alkaline earth metal salt of a carboxylic acid is at least one of an alkali or alkaline earth metal salt of propionic acid, butyric acid, isopentanoic acid, hexanoic acid, 2-ethylbutyric acid, nonanoic acid, decanoic acid, 2-ethylhexanoic acid, isooctanoic acid, isononanoic acid, neodecanoic acid, dodecanoic acid, lauric acid, palmitic acid, stearic acid, oleic acid, linoleic acid, naphthenic acids, tall oil acids, rosin acids.

13. The process of claim 10 wherein the alkali or alkaline earth metal salt of a carboxylic acid is calcium isooctanoate.

* * * * *